(12) United States Patent
Bell et al.

(10) Patent No.: US 8,140,767 B2
(45) Date of Patent: Mar. 20, 2012

(54) CACHE MANAGEMENT THROUGH DELAYED WRITEBACK

(75) Inventors: Gordon Bernard Bell, Cary, NC (US); Anil Krishna, Cary, NC (US); Brian Michael Rogers, Durham, NC (US); Ken Van Vu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 12/478,555

(22) Filed: Jun. 4, 2009

(65) Prior Publication Data
US 2010/0312970 A1 Dec. 9, 2010

(51) Int. Cl.
*G06F 12/08* (2006.01)
(52) U.S. Cl. ...................................................... 711/136
(58) Field of Classification Search .................. None
See application file for complete search history.

(56) References Cited

U.S. PATENT DOCUMENTS

| | | | |
|---|---|---|---|
| 5,860,111 A | 1/1999 | Martinez, Jr. et al. | |
| 6,542,969 B1 | 4/2003 | Sato | |
| 6,675,262 B1 | 1/2004 | Wilson et al. | |
| 6,684,302 B2 | 1/2004 | Kershaw | |
| 7,434,007 B2 | 10/2008 | Evrard et al. | |
| 7,624,221 B1 * | 11/2009 | Case | 710/310 |
| 7,827,425 B2 * | 11/2010 | Hutsell et al. | 713/323 |
| 2004/0111566 A1 | 6/2004 | Edirisooriya et al. | |
| 2004/0117559 A1 | 6/2004 | Glasco et al. | |
| 2005/0055513 A1 * | 3/2005 | Chen et al. | 711/136 |
| 2005/0240731 A1 * | 10/2005 | Steely | 711/133 |
| 2006/0004963 A1 * | 1/2006 | Mattina et al. | 711/130 |
| 2007/0101067 A1 * | 5/2007 | Shafi et al. | 711/141 |
| 2007/0150688 A1 * | 6/2007 | Osborne et al. | 711/168 |
| 2007/0250667 A1 * | 10/2007 | Dement et al. | 711/136 |
| 2008/0244185 A1 | 10/2008 | O'Krafka et al. | |

* cited by examiner

*Primary Examiner* — Kaushikkumar Patel
(74) *Attorney, Agent, or Firm* — Yee & Associates, P.C.; Yuanmin Cai

(57) ABSTRACT

The illustrative embodiments provide a method, apparatus, and computer program product for managing a number of cache lines in a cache. In one illustrative embodiment, it is determined whether activity on a memory bus in communication with the cache exceeds a threshold activity level. A least important cache line is located in the cache responsive to a determination that the threshold activity level is exceeded, wherein the least important cache line is located using a cache replacement scheme. It is determined whether the least important cache line is clean responsive to the determination that the threshold activity level is exceeded. The least important cache line is selected for replacement in the cache responsive to a determination that the least important cache line is clean. A clean cache line is located within a subset of the number of cache lines and selecting the clean cache line for replacement responsive to an absence of a determination that the least important cache line is not clean, wherein the each cache line in the subset is examined in ascending order of importance according to the cache replacement scheme.

14 Claims, 9 Drawing Sheets

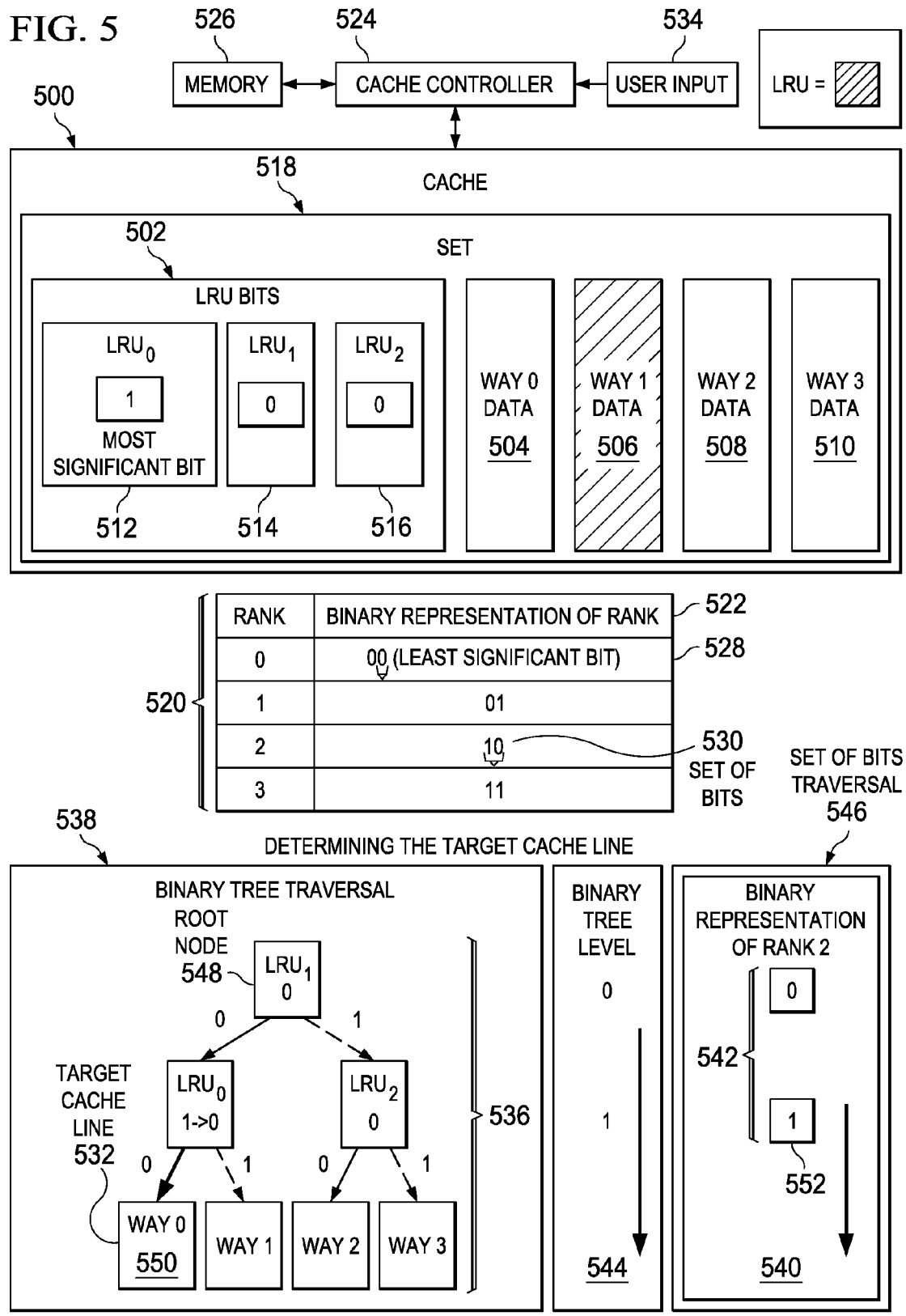

CACHE MANAGEMENT THROUGH DELAYED WRITEBACK

BACKGROUND

1. Field

The disclosure relates generally to an improved data processing system and more specifically to a method, computer program product, and apparatus for improved cache management. Still more particularly, the illustrative embodiments provide a method, apparatus, and computer program product for managing a number of cache lines in a cache.

2. Description of the Related Art

A cache is used by a processing unit of a computer to reduce the average time to access memory. The cache is a smaller, faster memory. The cache stores copies of the data from the most frequently used main memory locations. When the processing unit wishes to read or write a location in main memory, the processing unit first checks whether that memory location is in the cache. One way the check is performed is to compare the memory address sought by the operation being performed by the processing unit with the memory addresses available in the parts of the cache that may contain the data at the desired memory address.

For example, if the desired memory address is found in the cache, finding the desired memory address is referred to as a cache hit. The data at the corresponding cache location is transferred to the processing unit for immediate use, and the processing unit does not need to wait for the slower main memory to transmit the data at the requested memory address.

However, in the event the desired memory address is not presently stored in the cache, it is referred to as a cache miss. The data must be transferred from main memory to the processing unit using a memory bus prior to use. The data transferred from memory is typically stored in the cache, once transferred from main memory, for future use by the processing unit. Since the cache is smaller than main memory, only a portion of the memory addresses within main memory may be stored in the cache at a particular point in time. When the cache is full and data is transferred from main memory, an entry, or cache line, in the cache must be overwritten. If the cache line has been changed by an operation of the processor unit since being loaded into the cache from main memory, it is referred to as dirty. To prevent data loss, a dirty cache line is written to main memory prior to being overwritten by a new cache line. The method of selecting the cache line to be overwritten is referred to as a cache replacement scheme.

In times of heavy system utilization, a large number of cache lines may be replaced, or evicted, by incoming data from main memory. Some of the cache lines to be overwritten may be dirty. Performance is degraded by standard cache replacement schemes that write the dirty cache lines back to main memory during the time of heavy utilization. The memory bus, which is already transferring the large number of main memory read requests as a result of the heavy system utilization, also transfers the write requests generated by the cache evictions.

SUMMARY

One or more illustrative embodiments provide a method, apparatus, and computer program product for managing a number of cache lines in a cache. In one illustrative embodiment, it is determined whether activity on a memory bus in communication with the cache exceeds a threshold activity level. A least important cache line is located in the cache responsive to a determination that the threshold activity level is exceeded, wherein the least important cache line is located using a cache replacement scheme. It is determined whether the least important cache line is clean responsive to the determination that the threshold activity level is exceeded. The least important cache line is selected for replacement in the cache responsive to a determination that the least important cache line is clean. A clean cache line is located within a subset of the number of cache lines and selecting the clean cache line for replacement responsive to an absence of a determination that the least important cache line is not clean, wherein the each cache line in the subset is examined in ascending order of importance according to the cache replacement scheme.

BRIEF DESCRIPTION OF THE SEVERAL VIEWS OF THE DRAWINGS

FIG. 5 is a diagram depicting a process for locating a cache line in a cache by rank in a pseudo-LRU cache replacement scheme in accordance with an illustrative embodiment.

DETAILED DESCRIPTION

Figure 1:
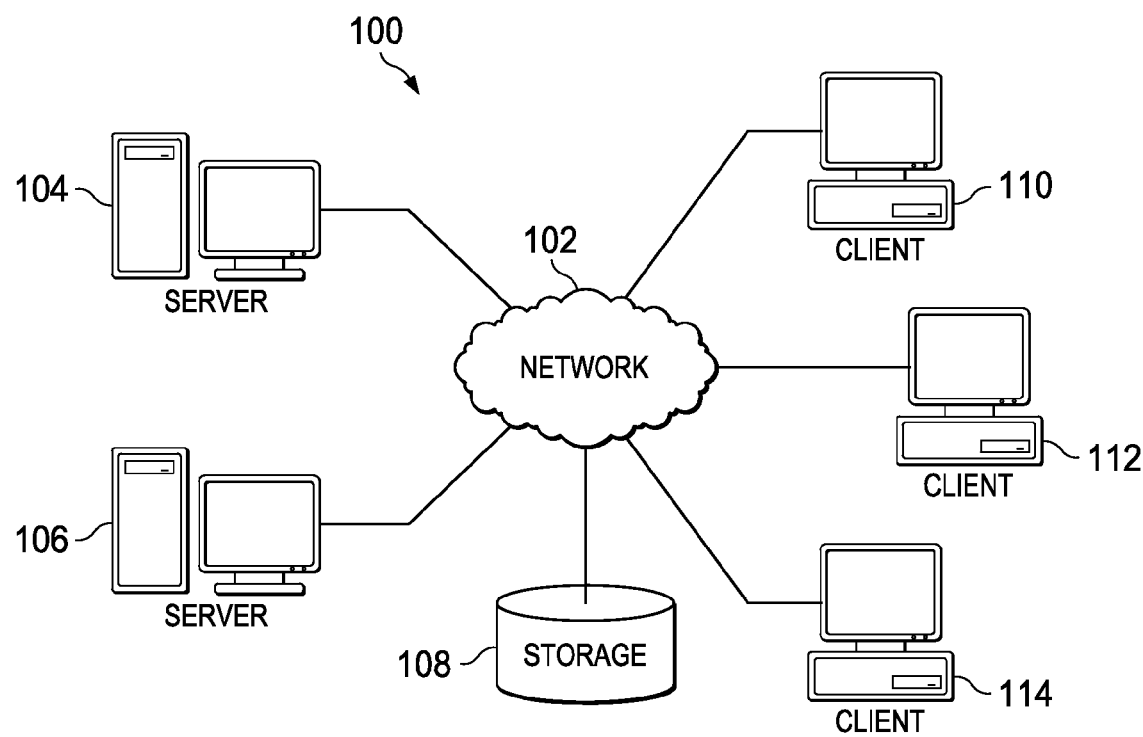
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a pictorial representation of a network of data processing systems in which illustrative embodiments may be implemented. Network data processing system 100 is a network of computers in which the illustrative embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server computer 104 and server computer 106 connect to network 102. In addition, client computers 108, 110, and 112 connect to network 102. Storage unit 114 may also connect to network 102. Client computers 108, 110, and 112 may be, for example, personal computers or network computers. In the depicted example, server computer 104 provides data, such as boot files, operating system images, and applications to client computers 108, 110, and 112. Client computers 108, 110, and 112 are clients to server computer 104 in this example. Network data processing system 100 may include additional server computers, client computers, and other devices not shown. A messaging system may be implemented in network data processing system 100 using a messaging server executing on server computer 104, server computer 106, or both, and a messaging client executing on one or more of client computers 108, 110, and 112. Alternatively, server computer 104 and client computer 108 may instead be located within the same physical machine.

Program code located in network data processing system 100 may be stored on a computer recordable storage medium and downloaded to a data processing system or other device for use. For example, program code may be stored on a computer recordable storage medium on server computer 104 and downloaded to client computer 108 over network 102 for use on client computer 108.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example and not as an architectural limitation for the different illustrative embodiments.

Figure 2:
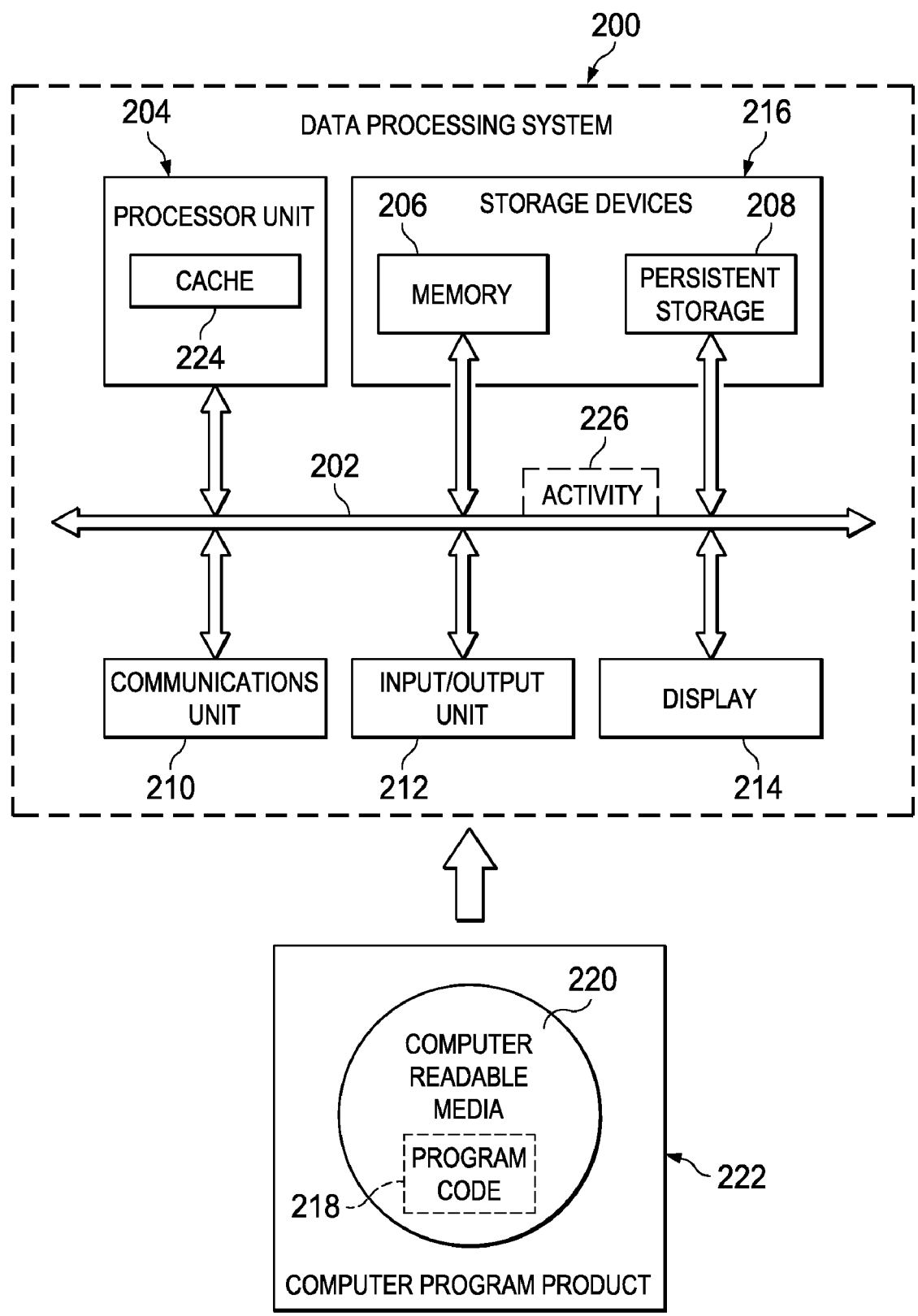
FIG. 2 is a block diagram of a data processing system in which illustrative embodiments may be implemented.

With reference to FIG. 2, a diagram of a data processing system is depicted in accordance with an illustrative embodiment. Data processing system 200 is an example of a data processing system that may be used to implement computers in FIG. 1. For example, data processing system 200 may implement servers 104 and 106 and/or clients 108, 110, and 112. In this illustrative example, data processing system 200 includes communications fabric 202, which provides communications between processor unit 204, memory 206, persistent storage 208, communications unit 210, input/output (I/O) unit 212, and display device 214. In some illustrative embodiments, activity 226 travels through communications fabric 202. Activity 226 may be, for example, one or more memory read and/or one or more memory write requests.

Activity 226 may travel between processor unit 204 and memory 206 in either or both directions.

Processor unit 204 serves to execute instructions for software that may be loaded into memory 206. Processor unit 204 may be a set of one or more processors or may be a multi-processor core, depending on the particular implementation. Furthermore, processor unit 204 may be implemented using one or more heterogeneous processor systems in which a main processor is present with secondary processors on a single chip. As another illustrative example, processor unit 204 may be a symmetric multi-processor system containing multiple processors of the same type. Processor unit 204 may contain one or more of cache 224.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communication links.

Input/output unit 212 allows for input and output of data with other devices that may be connected to data processing system 200. For example, input/output unit 212 may provide a connection for user input through a keyboard, a mouse, and/or some other suitable input device. Display device 214 provides a mechanism to display information to a user.

Instructions for the operating system, applications and/or programs may be located in storage devices 216, which are in communication with processor unit 204 through communications fabric 202. Programs located in one or more of storage devices 216 and in communication with processor unit 204 through communications fabric 202 may be, for example, one or more messaging servers and messaging clients. In these illustrative examples the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206. The computer implemented instructions may cause processing unit 204 to provide a messaging server, a messaging client, or both.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communication link and/or the connection may be physical or wireless in the illustrative examples. The computer readable media 220 also may take the form of non-tangible media, such as communication links or wireless transmissions containing the program code 218.

In some illustrative embodiments, program code 218 may be downloaded over a network to persistent storage 208 from another device or data processing system for use within data processing system 200. For instance, a program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code 218. As one example, the data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Furthermore, a memory may be, for example, memory 206 or a cache such as found in an interface and memory controller hub that may be present in communications fabric 202.

The different illustrative embodiments recognize and take into account a number of considerations. For example, the different illustrative embodiments recognize that memory bandwidth demand for many applications is not constant, regardless of the number of threads simultaneously executing the application. The illustrative embodiments also recognize that during times of high system utilization, performance may be hindered by the limited nature of off-chip memory bandwidth. Additionally, normal cache replacement schemes write back dirty cache lines while the memory bus is being heavily utilized with read requests, thereby slowing the completion of read requests and reducing overall system performance. In view of these considerations and/or possibly other considerations, the different advantageous embodiments recognize that it would to advantageous to have a method, apparatus, and computer program product that takes into account one of more of the issues discussed above as well as possibly other issues.

Thus, the illustrative embodiments provide a method, apparatus, and computer program product for managing a number of cache lines in a cache. In one illustrative embodiment, it is determined whether activity on a memory bus in communication with the cache exceeds a threshold activity level. A least important cache line is located in the cache responsive to a determination that the threshold activity level is exceeded, wherein the least important cache line is located using a cache replacement scheme. It is determined whether the least important cache line is clean responsive to the determination that the threshold activity level is exceeded. The least important cache line is selected for replacement in the cache responsive to a determination that the least important cache line is clean. A clean cache line is located within a subset of the number of cache lines and selecting the clean cache line for replacement responsive to an absence of a determination that the least important cache line is not clean, wherein the each cache line in the subset is examined in ascending order of importance according to the cache replacement scheme.

Figure 3:
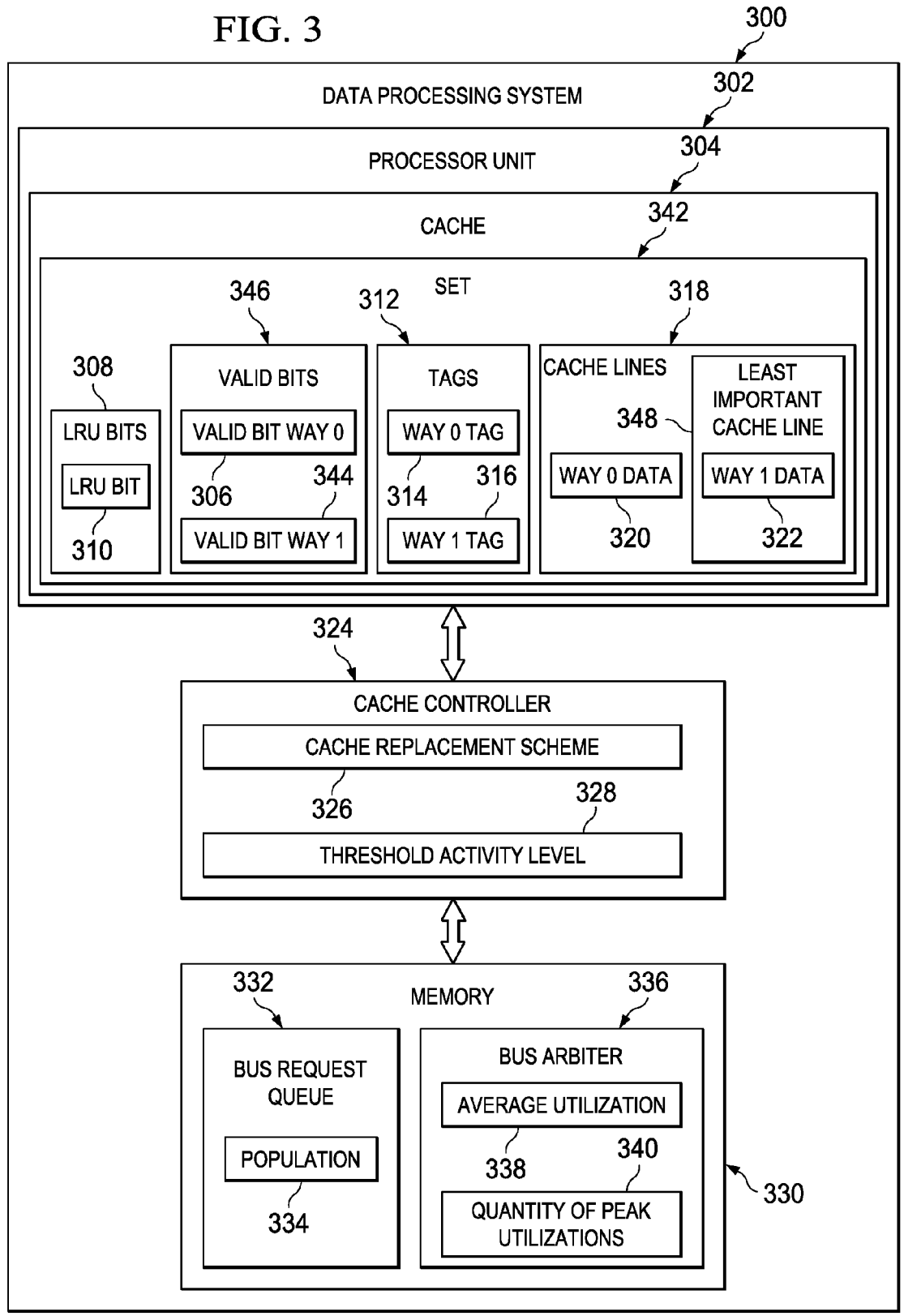
FIG. 3 is a block diagram of a cache within a data processing system in accordance with an illustrative embodiment.

With reference to FIG. 3, a block diagram of a cache within a data processing system in accordance with an illustrative embodiment is depicted. In illustrative examples, data processing system 300 may implement a number of illustrative embodiments that manage a number of cache lines in a cache 304. A number as used herein with reference to items means one or more items. For example, a number of cache lines is one or more cache lines. In illustrative embodiments, data processing system 300 may be implemented by data processing system 200. Processor unit 302 may be implemented by processor unit 204. Additionally, cache 304 may be implemented by cache 224. In an illustrative embodiment depicted in FIG. 3, cache 304 is a 2-way set-associative cache. Way 0 tag 314, way 1 tag 316, way 0 data 320, and way 1 data 322, make up the two ways of the 2-way associative cache. However, cache 304 is not limited to a 2-way set associative cache. The number of ways in cache 304 is merely an example, and should not be construed as limiting as to the number of ways with which cache 304 may implemented. Additionally, in other embodiments, cache 304 may be, for example, a direct-mapped cache or a fully associative cache.

In an illustrative embodiment, cache 304 contains one or more of set 342. Set 342 contains valid bits 346, LRU bits 308, tags 312, and cache lines 318. Set 342 may be differentiated from another set 342 in cache 304 using a set index or identifier. LRU bits 308 may contain LRU bit 310. LRU bit 310 is set during each access of cache lines 318 within set 342 and indicates the least recently used way in set 342. LRU bits 308 may differ in number based on the number of ways in set 342. In an illustrative embodiment, a two-way set associative cache, such as cache 304, may only require one LRU bit 310 to indicate the least recently used cache line from cache lines 318.

Tags 312 contain way 0 tag 314 and way 1 tag 316. Way 0 tag 314 and way 1 tag 316 may be values used to identify the addresses in memory 330 corresponding to way 0 data 320, and way 1 data 322, respectively. Cache lines 318 contain way 0 data 320 and way 1 data 322. Way 0 data 320 and way 1 data 322 may contain data copied from memory 330 for use by processor unit 302. In an illustrative embodiment, way 1 data 322 is also the least important cache line 348 to be replaced in cache 304 by other data requested by processor unit 302 from memory 330.

Valid bits 346 contain valid bit way 0 306 and valid bit way 1 344. Valid bits 346 indicate whether the respective ways in set 342 are clean or dirty. For example, if way 0 data 320 was modified by processor unit 302 since being copied into cache 304, valid bit way 0 306 would reflect that way 0 data 320 is dirty and must be written back to memory 330 prior to replacement to avoid data loss.

In an illustrative embodiment, cache controller 324 implements cache replacement scheme 324 for cache 304. In this example, cache controller 324 and cache 304 implement a pseudo-least recently used (hereinafter, pseudo-LRU) replacement scheme. However cache controller 324 and cache 304 are not architecturally limited to implementing pseudo-LRU and may implement a variety of other cache replacement schemes, such as least recently used, most recently used, and/or segmented least recently used. Furthermore, the location of cache controller 324 in FIG. 3 should not be construed as a limitation. For example, cache controller 324 may also be located in cache 304, processor unit 302, or memory 330.

In illustrative embodiments, cache controller 324 stores and/or maintains a threshold activity level 328. Cache controller 324 compares activity level on the bus between memory 330 and processor unit 302 to threshold activity level 328. Threshold activity level 328 may be, for example, in the form of an average utilization of the bus, a static utilization value, a multi-tiered utilization value, or any combination thereof. Cache controller 324 may monitor the activity level on the bus by checking population 334 of bus request queue 332. Cache controller 324 may monitor the activity level by, for example, polling bus request queue 332 for population 334 on a time interval. Bus request queue 332 may be one or more individual read request queues and write request queues. Bus request queue 332 may also be a single queue for both read and write requests. Cache controller 324 may also be notified of population 334 by memory 330.

If population 334 exceeds threshold activity level 328, cache controller 324 modifies cache replacement scheme 326. When data is subsequently transferred to processor unit 302 for storage in cache 304, and cache 304 is full, cache controller 324 locates the set 342 which is associated with the memory address within memory 330 from which the data is being transferred. Cache controller 324 uses LRU bit 310 to determine the least recently used cache line from cache lines 318. Cache controller 324 then determines whether the least recently used cache line is clean using LRU bit 310.

If the least recently used cache line is clean, cache controller 324 selects the least recently used cache line for replacement. Otherwise, cache controller 324 examines cache lines 318 in ascending order of rank until a clean cache line is located in set 342. The least used cache line is referred to as rank 0. The most recently used cache line has rank N−1, where N is the number of ways in set 342. If a clean cache line is located, cache controller 324 selects the clean cache line for replacement. Cache controller 324 may examine a subset of the ways in set 342, where the size of the subset is determined by a user input. Alternatively, cache controller 324 may examine all ways in set 342. If no clean cache line exists within set 342, the least recently used cache line in set 342 is selected for replacement.

In other embodiments, the functions of cache controller 324 are supplemented or replaced by bus arbiter 336. Bus arbiter 336 may monitor population 334 of bus request queue 332, and compare population 334 to threshold activity level 328. Threshold activity level 328 may be, for example, an average utilization 338 of the memory bus, or a quantity of peak utilizations 340 of the memory bus. In illustrative embodiments, bus arbiter 336 modifies cache replacement scheme 326 and/or transmits a message to cache controller 324 to modify cache replacement scheme 326.

The illustration of data processing system 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, data processing system 300 may contain more than one of processor unit 302. More than one processor unit 302 may share one cache 304, or each processor unit 302 may contain one or more of cache 304. The more than one cache 304 may have different levels of associativity, and may be controlled by a single cache controller 324, or more than one of cache controller 324. Cache 304 may contain more than one set 342. Furthermore, data processing system 300 may contain more than one cache controller 324 and/or more than one memory 330.

Figure 4:
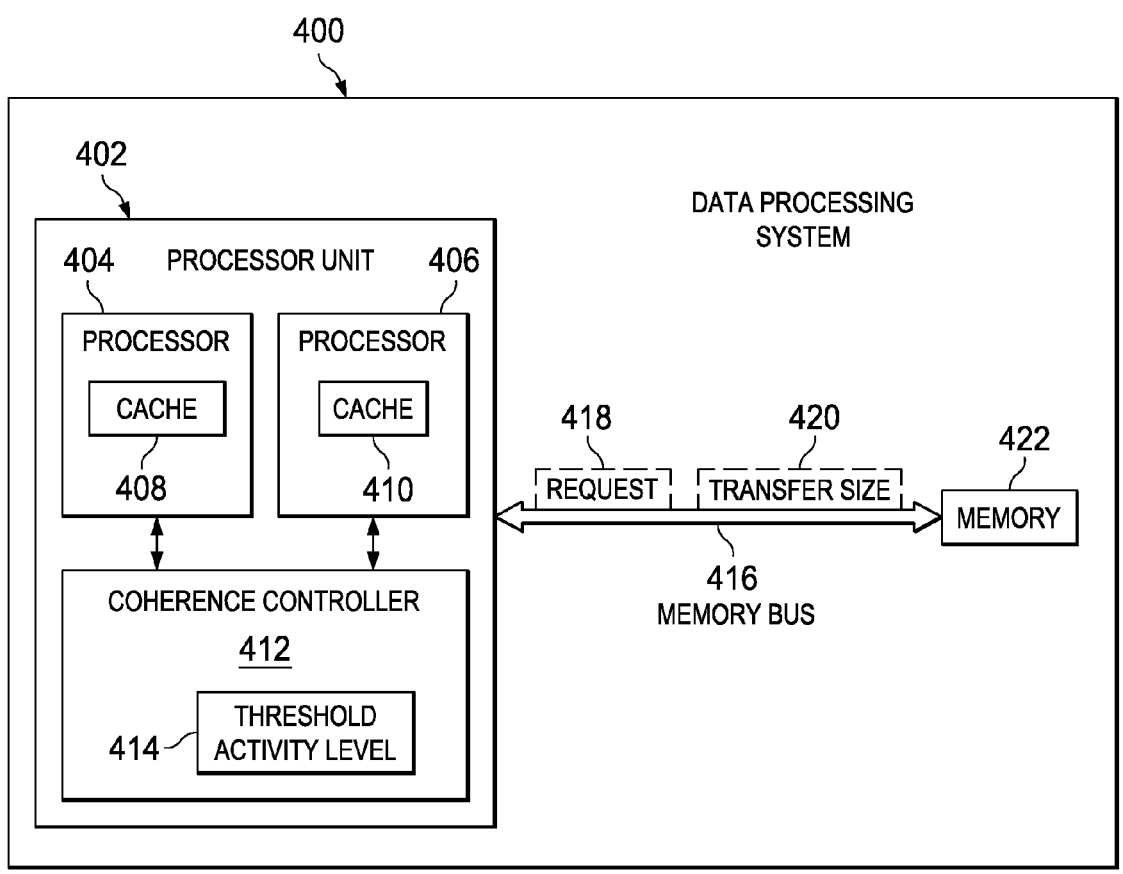
FIG. 4 is a block diagram of multiple processors managed by a coherence controller in a data processing system in accordance with an illustrative embodiment.

Turning now to FIG. 4, a block diagram of multiple processors managed by a coherence controller in a data processing system in accordance with an illustrative embodiment is depicted. Data processing system 400 may be implemented in data processing system 300 and/or data processing system 200. Processor unit 402 may be implemented in processor unit 302 and/or processor unit 204. Cache 408 and/or cache 410 may be implemented in cache 304 and/or cache 224. Memory bus 416 may be implemented in communication fabric 202. Memory 422 may be memory 330 and/or memory 206.

In some illustrative embodiments, processor unit 402 contains multiple processors, such as processor 404 and processor 406. One example of a processor unit 402 that contains multiple processors is a multi-core processor that implements symmetric multiprocessing (SMP). In an illustrative embodiment, each processor 404 and processor 406 within processor unit 402 maintain a separate cache 408 and cache 410, respectively. However, each processor 404 and processor 406 shares memory 422. Each processor 404 and processor 406 contains a separate cache.

In an illustrative embodiment, processor 404 contains cache 408 and processor 406 contains cache 410. Coherence controller 412 maintains coherence between cache 408 and 410. Coherence controller 412 may maintain coherence between cache 408 and 410, for example, by updating data in one or both of cache 408 and cache 410. Maintaining coherence between cache 408 and cache 410 may be necessary if, for example, processor 404 and processor 406 have both cached the same data in cache 408 and cache 410, respectively. The data in cache 408 may be modified by an operation of processor 404, but the data has not yet written back to memory coherence controller 412. Performing an operation on the copy of the data in cache 410 would corrupt data because cache 410 does not have the latest version of the data. Cache 410 does not have the latest version of the data because the latest version is stored in cache 408, after being modified by processor 404.

In illustrative embodiments, coherence controller 412 also monitors memory bus 416. Coherence controller 412 examines one or more requests 418 and their corresponding transfer sizes 420. Alternatively, coherence controller may monitor a bus request queue, such as bus request queue 332. Coherence controller 412 compares the requests 418 and corresponding transfer sizes 420 to threshold activity level 414. Threshold activity level 414 may be threshold activity level 328. If threshold activity level 414 is exceeded, coherence controller 412 may modify the cache replacement scheme. When cache 408 and/or cache 410 are full, and new data is received from memory for storage in cache 408 and/or cache 410, coherence controller 412 may select for replacement the clean cache line with the lowest rank. Coherence controller 412 may examine only subset of the cache lines in the appropriate set in cache 408 and/or cache 410. The size of the subset may be determined by user input. Alternatively, coherence controller 412 may examine all cache lines in the appropriate set in cache 408 and/or cache 410.

The illustration of data processing system 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, processor 400 and/or processor 406 may contain more than one cache 408 and/or cache 410. Processor unit 402 may contain more than two of processor 404 and/or processor 406. Data processing system 400 may also contain more than one memory bus 416 and/or memory 422. Additionally, coherence controller 412 may contain more than one threshold activity level 414.

Turning now to FIG. 5, a diagram depicting a process for locating a cache line in a cache by rank in a pseudo-LRU cache replacement scheme in accordance with an illustrative embodiment is shown. Cache 500 is an example of one implementation of cache 304 in FIG. 3. Set 518 is an example of one implementation of set 342 in FIG. 3. LRU bits 502 are examples of one implementation of LRU bits 308 in FIG. 3. Way 0 data 504, way 1 data 506, way 2 data 508, and way 3 data 510 are examples of implementations of way 0 data 320 and/or way 1 data 322 in FIG. 3. Cache controller 524 is an example of one implementation of cache controller 324 in FIG. 3. Memory 526 is an example of one implementation of memory 330 in FIG. 3 and/or memory 422 in FIG. 4.

In an illustrative embodiment, cache 500 is a 4-way set associative cache with LRU bits 502. Specifically, the combination of $LRU_0$ 512, $LRU_1$ 514, and $LRU_2$ 516 maintains a ranking of recency across the ways in set 518.

In some embodiments, the cache replacement scheme enforced by cache controller 524 is pseudo-LRU. Under pseudo-LRU, LRU bits 502 maintain a partial ranking of recency across the ways in set 518. The number of LRU bits 502 used to maintain recency rankings for a set 518 in a pseudo-LRU implementation may be $\log_2((n-1)!)$. In an embodiment depicted in FIG. 4, cache 500 is a 4-way set associative cache. Therefore, the number of LRU bits 502 used to maintain recency rankings in accordance with a pseudo-LRU cache replacement scheme is three, represented by $LRU_0$ 512, $LRU_1$ 514, and $LRU_2$ 516. This pseudo-LRU implementation may maintain $2^3=8$ rankings, out of a possible 4!=24 recency rankings for the four ways in set 518.

In illustrative embodiments, cache controller 524 locates the least recently used way with rank n in set 518 by manipulating LRU bits 502. Rank indicates the recency of use for a given way in set 518, as compared to the other ways in set 518. A way with rank 0 is the least recently used way in set 518, and is the lowest rank in set 518. A way with rank 1 is the next more recently used way. More generally, a way with rank n indicates the way was used more recently than the way with rank n−1, but less recently than the rank with n+1.

LRU bits 502 may be represented with binary tree 536. Traversing binary tree 536 using LRU bits 502 leads to way 1 data 506. In this example, way 1 data 506 is the least recently used cache line in set 518. Therefore, way 1 data 506 has rank 0.

Cache controller 524 may generate a binary representation of a desired rank 522, as shown in table 520. In an illustrative embodiment, cache controller 524 transforms LRU bits 502 using binary representation of rank 522. Binary representation of rank 522 may be composed of a set of bits, such as set of bits 530. In illustrative embodiments, the number of bits in set of bits 530 is the same as the number of levels in binary tree 536.

Cache controller 524 then transforms LRU bits 502 by applying the binary representation of rank n 522. Cache controller 524 may duplicate LRU bits 502 in temporary storage, such as one or more registers, prior to transforming LRU bits 502. Cache controller 524 uses LRU bits 502 to determine a target cache line, such as target cache line 532, by traversing binary representation of rank n 522 and binary tree 536. Cache controller traverses binary representation of rank n 522 in a binary tree traversal, such as binary tree traversal 538. Cache controller 524 selects the target cache line for replacement in cache 500. Cache controller 524 traverses binary tree 536 from root node to leaf node. Cache controller 524 traverses binary representation of rank n 522 from least significant bit to most significant bit. An example of the set of bits traversal is set of bits traversal 546.

Each time cache controller 524 encounters a new level of binary tree 536 during traversal of binary tree 536, cache controller 524 advances the traversal of binary representation of rank n 522 by one bit. When a '1' is encountered during the traversal of binary representation of rank n 522, the corresponding LRU bit in binary tree 536 is inverted prior to determining the next node in the traversal of binary tree 536.

Cache controller 524 then advances the traversals and repeats the process of checking the corresponding bit in binary representation of rank n 522 on the next level of binary tree 536 and the next more significant bit in binary representation of rank n 522. When cache controller 524 completes the traversal of binary tree 536 by reaching the deepest level of binary tree 536, the way in set 518 reached is the desired rank cache way 550 and represents the way with rank n.

Cache controller 524 then checks whether data in desired rank cache way 550, such as way 1 data 506, is clean. If way n data is clean, cache controller 524 selects way n for replacement. If way n data is dirty, cache controller may increase rank by 1 and repeat the process until cache controller 524 determines that there are no clean ways in set 518. If it is determined that there are no clean ways in set 518, cache controller 524 may select the least recently used way with rank 0 for replacement.

By way of example, to locate the way in set 518 with rank 2, cache controller 524 determines the binary representation of rank 2 540, which is also shown in table 520 as '10'. Cache controller 524 then transforms LRU bits 502 '100' by applying the binary representation of rank 2 540. The application is performed by traversing binary representation of rank 2 540 and binary tree 536. Cache controller 524 traverses binary tree 536 from root node to leaf node. In this example, cache controller 524 traverses binary tree 536 from top to bottom, starting with $LRU_1$. Cache controller 524 traverses binary representation of rank 2 540 from least significant bit to most significant bit. In this example, cache controller 524 begins the traversal of binary representation of rank 2 540 at the '0' bit.

Continuing with the example, cache controller 524 begins the traversal of binary tree 536 at root node 548, $LRU_1$. Cache controller 524 begins the traversal of binary representation of rank 2 540 at '0', because '0' is the least significant bit in binary representation of rank 2 540. Since the bit in binary representation of rank 2 540 corresponding to the root node in binary tree 536 is a '0', no change is made to $LRU_1$ in binary tree 536. Both traversals then continue to the next level.

Because cache controller 524 encountered a 0 at $LRU_1$ in this example, cache controller 524 advances to $LRU_0$ in the traversal of binary tree 536. Cache controller 524 also advances the traversal of binary representation of rank 2 540 to the next most significant bit in binary representation of rank 2 540. In this example, cache controller 524 advances to the '1' bit, the most significant bit in binary representation of rank 2 540.

The bit in binary representation of rank 2 540 corresponding to the LRU bit currently under examination, or current bit 552, can also be determined by matching the distance 542 in from the least significant bit in binary representation of rank 2 540 in number of bits with the current binary tree level 544. In this example, the '1' in binary representation of rank 2 540 is the corresponding bit for $LRU_0$ because distance 542 of '1' from the least significant bit is 1, and binary tree level 544 for $LRU_0$ is 1. Therefore, '1' is the corresponding bit for determining whether to flip $LRU_0$.

Since the bit in binary representation of rank 2 540 corresponding to the current level in binary tree 536 is a '1', cache controller 524 flips LRU 0 from '1' to '0'. Cache controller 524 then completes the traversal of binary tree 536, ending at way 0. Way 0 is target cache line 532 in this example, and is the least recently used way with rank 2.

If way 0 data is clean, cache controller 524 selects way 0 for replacement. If way 0 data is dirty, cache controller may increase rank by 1 and repeat the process until it is determined that there are no clean ways in set 518. If it is determined that there are no clean ways in set 518, cache controller 524 may select the least recently used way with rank 0 for replacement.

However, in some embodiments, cache controller 524 accepts a user input 534, which designates a subset of cache lines to examine. The user input 534 may be in the form of a value representing the maximum rank to examine during the process of determining which way to select for replacement.

In an illustrative embodiment, cache controller 524 duplicates LRU bits 502 and performs the transformation on the duplicate of LRU bits 502. However, in some embodiments, cache controller 524 may modify LRU bits 502. In such embodiments, cache controller 524 may reset LRU bits 502 to the original values after the way to be replaced is determined. Performing the transformation on a duplicate of LRU bits 502 or resetting LRU bits 502 to the original values prevents cache controller 524 from disrupting the normal operation of the cache replacement scheme.

Figure 6A:
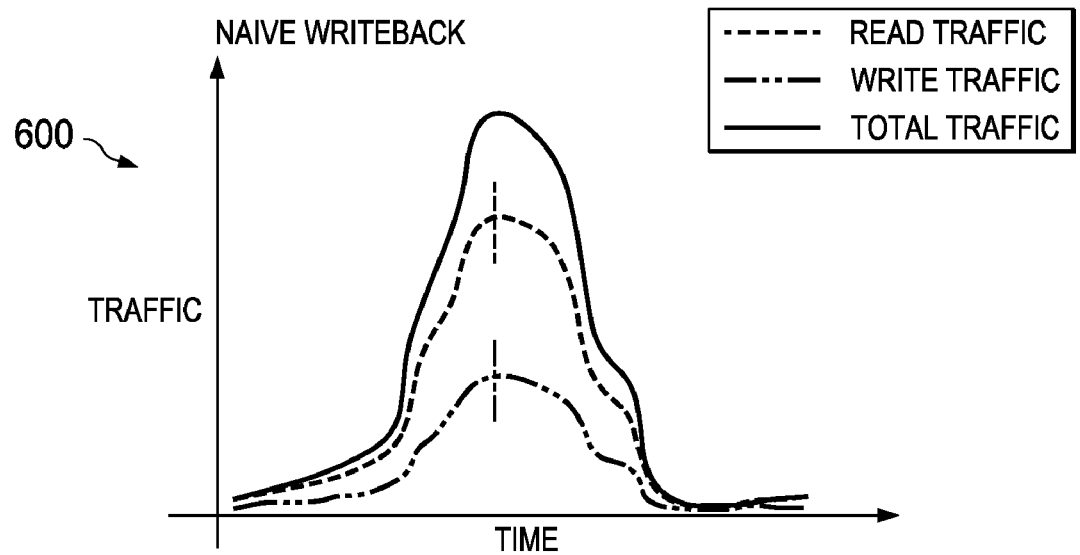
FIGS. 6A and 6B are a set of graphs depicting read and write traffic over time in accordance with an illustrative embodiment.
Figure 6B:
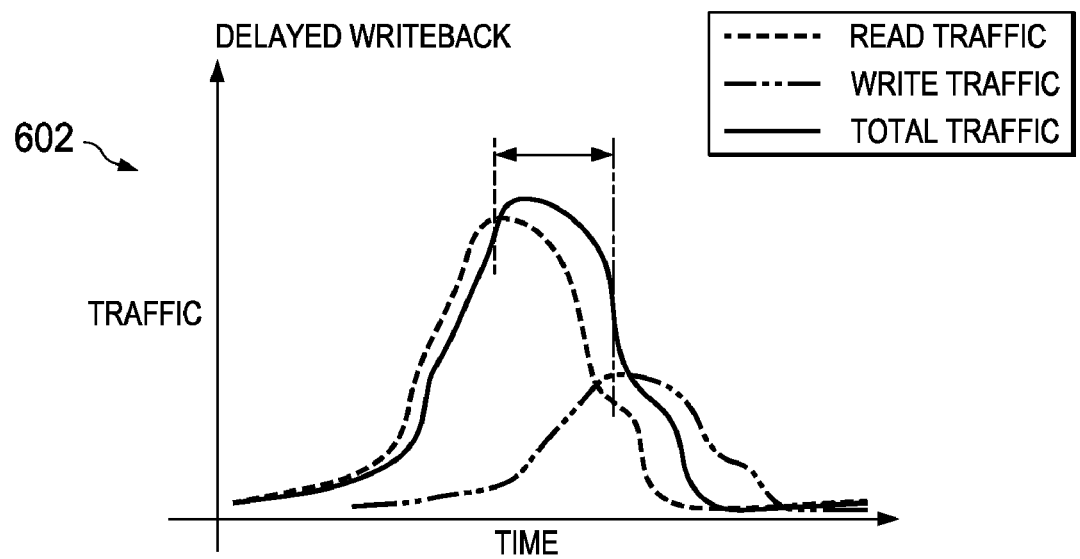

Turning now to FIGS. 6A and 6B, a set of graphs depicting read and write traffic over time in accordance with an illustrative embodiment is depicted. Graph 600 depicts an amount of read traffic, write traffic, and total traffic over a period of time. The read traffic in graph 600 may be generated by read requests from cache 304 to memory 330. The write traffic in graph 600 may be generated by write requests of cache data in cache 304, also known as writeback traffic or castout data, to memory 330. Graph 600 depicts traffic curves under a normal cache replacement scheme, such as cache replacement scheme 326. Read and write traffic in graph 600 peak at nearly the same time, causing total traffic to peak at substantially the same point in time.

Graph 602 depicts an amount of read traffic, write traffic, and total traffic over a period of time in accordance with an illustrative embodiment. The read traffic in graph 600 may be generated by read requests from cache 304 to memory 330. The write traffic in graph 600 may be generated by write requests, or writeback, of cache data in cache 304 to memory 330. In graph 602, the peaks of read traffic and write traffic are separated by a substantial period of time. The peaks in graph 602 may be separated because once a threshold activity level, such as threshold activity level 328, is exceeded, the cache replacement scheme is modified to select the least recently used clean cache line for replacement. Therefore, write traffic resulting from cache writebacks to memory may be delayed until threshold activity level is no longer exceeded.

Figure 7:
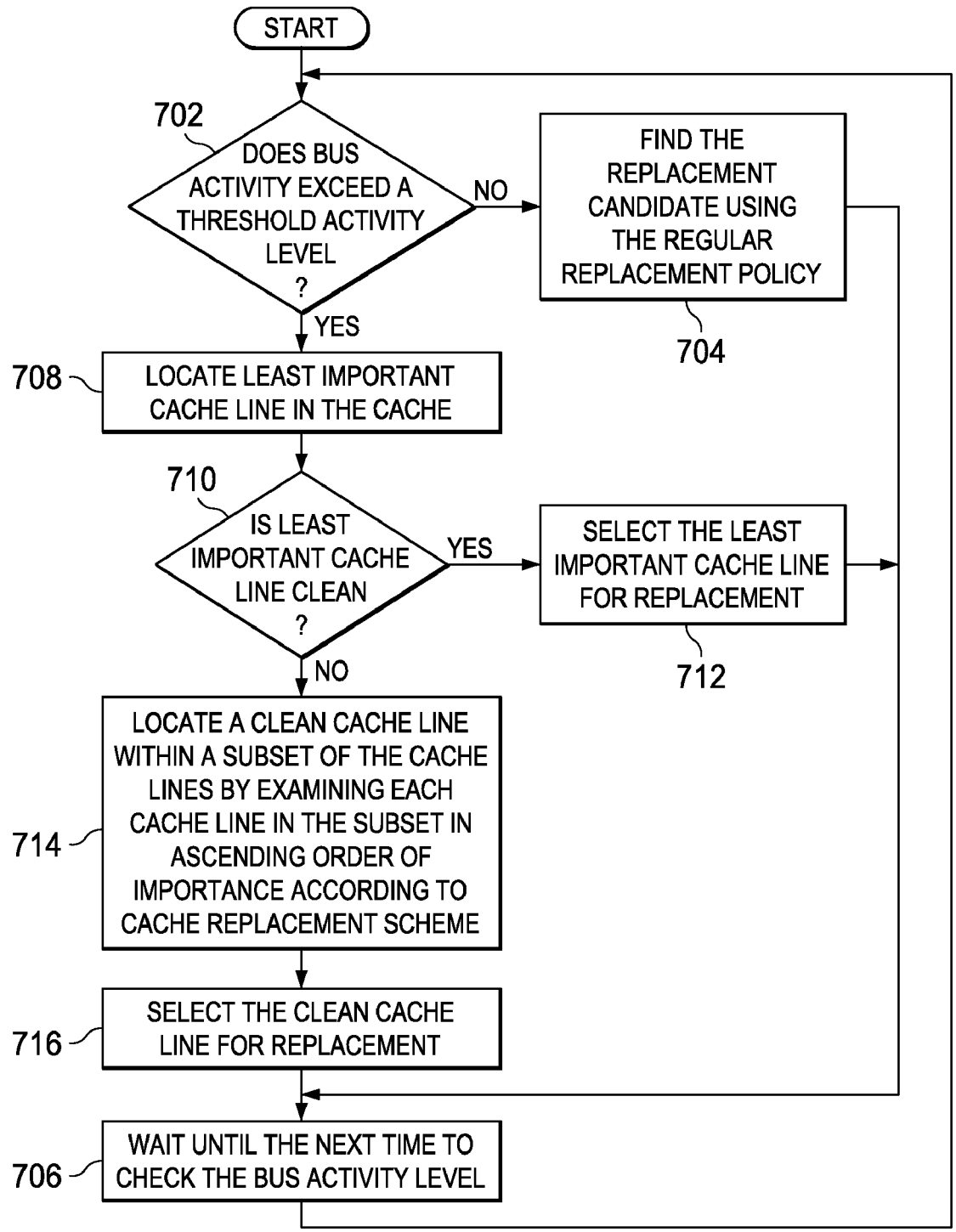
FIG. 7 is a flowchart of a process for determining a replacement candidate in a cache set in accordance with an illustrative embodiment.

Turning now to FIG. 7, a flowchart of a process for determining a replacement candidate in a cache set in accordance with an illustrative embodiment is depicted. In these examples the memory bus is in communication with the cache. In other words, the memory bus and the cache are connected to each other in a manner that allows for an exchange of information between these two components. The process may be implemented in data processing system 300 in FIG. 3. In some embodiments, the process is implemented by cache controller 324 in FIG. 3. The process begins by determining whether bus activity exceeds a threshold activity level (702). If the bus activity does not exceed the threshold activity level, the process finds a replacement candidate using the regular replacement policy (704). The regular replacement policy may be the default replacement policy for the cache controller or any other policy that is currently in use by the cache controller. The process then waits until the next time to check the bus activity level (706). The wait time may be static and/or set by the user. Alternatively, the wait time may be adaptive based on, for example, the current activity level.

If the bus activity does exceed the threshold activity level at step 702, the process locates the least important cache line in the cache (708). In an illustrative embodiment that implements pseudo-LRU, the least important cache line is the least recently used cache line. The process then determines whether the least important cache line is clean (710). If the least important cache line is clean, the process selects the least important cache line for replacement (712). The process then continues by performing step 706, that is, by waiting until the next time to check the bus activity level.

If the least important cache line is not clean at step 708, the process locates a clean cache line within a subset of the cache lines by examining each cache line in the subset in ascending order of importance according to a cache replacement scheme (712). The process then selects the clean cache line for replacement (714). The process then continues by performing step 706, that is, by waiting until the next time to check the bus activity level.

The process depicted in FIG. 7 is shown as a continuous process which does not terminate once started. However, it is understood that the process may be terminated and/or interrupted due to the occurrence of one or more events. Some examples of events that may terminate the process are the elapsing of a period of time, receiving a request from a user, and receiving a request from another component of the data processing system.

Figure 8:
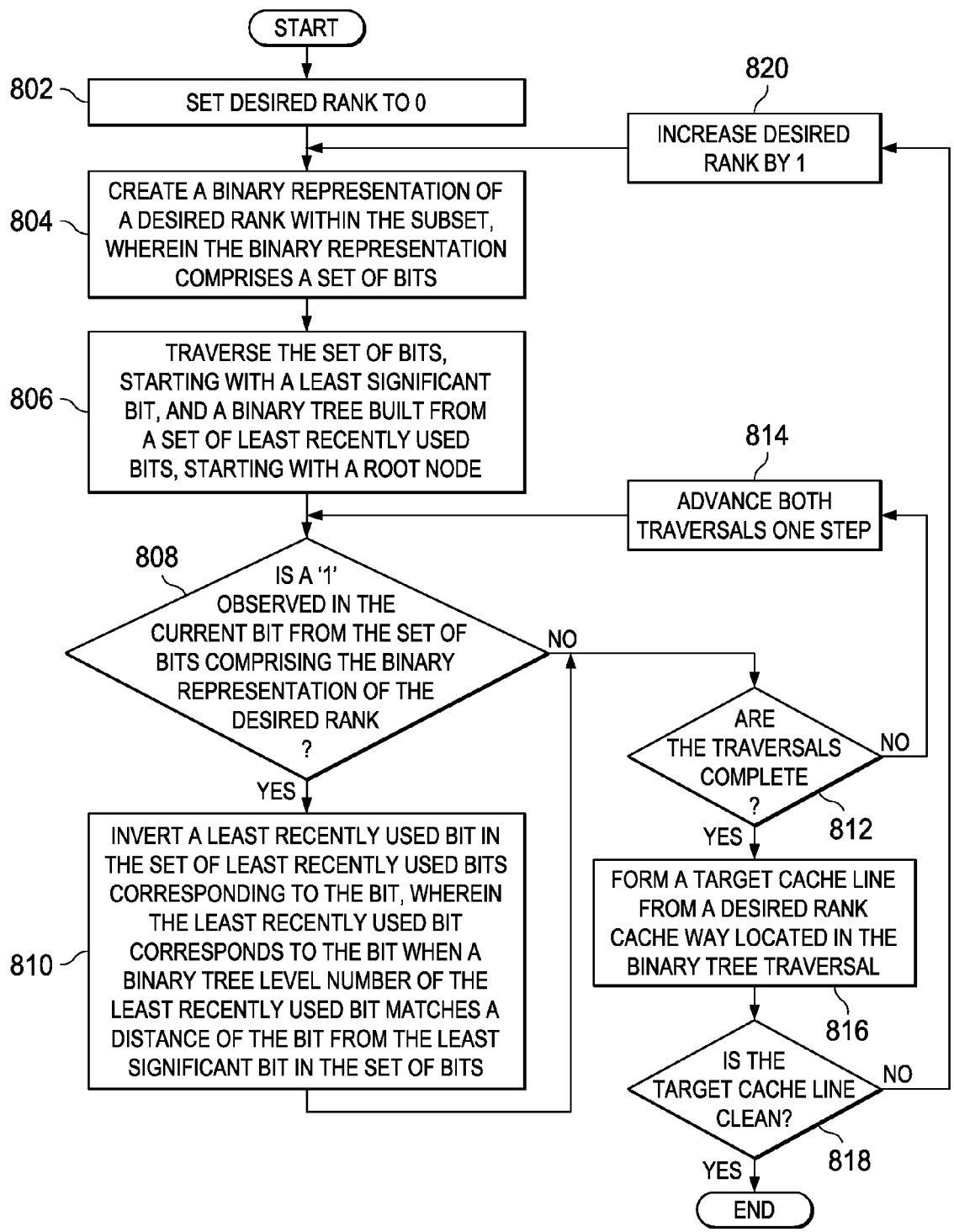
FIG. 8 is a flowchart of a process for determining a least recently used cache line with a desired rank in a cache in accordance with an illustrative embodiment.

Turning now to FIG. 8, a flowchart of a process for determining a least recently used cache line with a desired rank in a cache in accordance with an illustrative embodiment is depicted. The process may be implemented in data processing system 300. In some embodiments, the process is implemented by cache controller 324 in FIG. 3. In an illustrative embodiment, the process implements step 712 in a pseudo-LRU implementation. The process begins by setting the desired rank to 0 (802). A binary representation of the desired rank within the subset is created, wherein the binary representation comprises a set of bits (804). The process then traverses the set of bits, starting with a least significant bit, and a binary tree built from a set of least recently used bits, starting with a root node (806). The process then determines whether a '1' is observed in a current bit in the set of bits during a set of bits traversal (808). If the process determines that a '1' is observed at step 808, the process inverts a least recently used bit in the set of least recently used bits corresponding to the current bit (810). The least recently used bit corresponds to the current bit when a binary tree level number of the least recently used bit matches a distance of the current bit from the least significant bit in the set of bits.

For example, when the process observes the least significant bit in the set of 2 bits that comprise the binary representation of the desired rank, the current bit is at distance 0 from the least significant bit in the set of bits. In this example, the corresponding LRU bit in the binary tree is the LRU bit at binary tree level 0. Likewise, when the most significant bit in the same set of 2 bits is observed, the current bit is at distance 1 from the least significant bit in the set of bits. In this second example, the corresponding LRU bit in the binary tree is the LRU bit at binary tree level 1.

If the process determines that a '1' is not observed in the current bit from the set of bits at step 808, the process determines whether the set of bits traversal and the binary tree traversal are complete (812). The binary tree traversal is complete when the level being observed is the deepest level of the binary tree and no further levels exist. The set of bits traversal is complete when the current bit is the most significant bit. In that case, there are no bits more significant than the current bit to observe.

If the process determines at step 812 that the set of bits traversal and the binary tree traversal are not complete, the process advances the set of bits traversal and the binary tree traversal and returns to step 808 (814). In illustrative embodiments, the process advances the binary tree traversal by traversing the binary tree to a deeper level. In illustrative embodiments, the process advances the set of bits traversal by making the current bit the next more significant bit in the set of bits.

If the process determines at step 814 that the set of bits traversal and the binary tree traversal are complete, the process forms a target cache line from a desired rank cache way located in the binary tree traversal (816). The process then determines whether the target cache line is clean (818).

If the process determines at step 818 that the target cache line is not clean, the process increases the desired rank by 1 (820) and returns to step 804. If the process determines at step 818 that the target cache line is clean, the process terminates.

Figure 9:
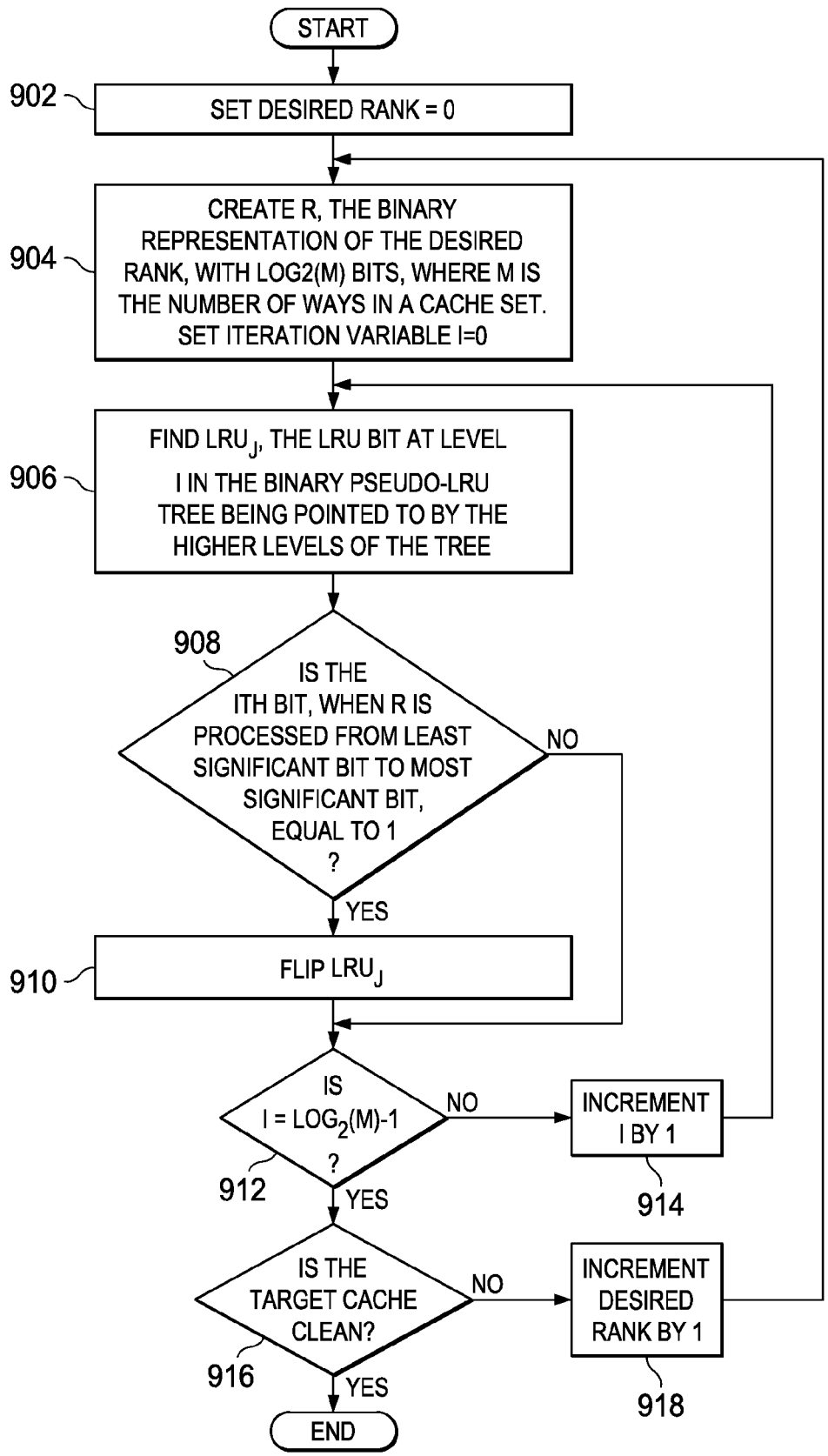
FIG. 9 is a flowchart of a second process for determining a least recently used cache line with a desired rank in a cache in accordance with an additional illustrative embodiment.

Turning now to FIG. 9, a flowchart of a second process for determining a least recently used cache line with a desired rank in a cache in accordance with an additional illustrative embodiment is depicted. The process may be implemented in data processing system 300. In some embodiments, the process is implemented by cache controller 324 in FIG. 3. In an illustrative embodiment, the process implements step 712 in a pseudo-LRU implementation.

The process begins by setting the desired rank to 0 (902). The process then creates R, the binary representation of the desired rank, with $\log_2(M)$ bits (904). M is the number of ways in the cache set. The process also sets iteration variable I to 0 at step 904.

The process then finds $LRU_I$, the LRU bit at level I in the binary pseudo-LRU tree (906). The LRU bit at level I is being pointed to by the higher levels of the tree. In illustrative embodiments, level 0 is the root level of the tree and level $\log_2(M)$ is the leaf level of the tree.

The process then determines whether the I-th bit, when processing R from the least significant bit to the most significant bit in R, is equal to 1 (908). If the process determines that the I-th bit is not equal to 1 at step 908, the process skips to step 912. If the process determines that the I-th bit is 1 at step 908, the process flips $LRU_I$ (910).

The process next determines whether I is equal to $\log_2(M)-1$ (912). In illustrative embodiments, I being equal to $\log_2(M)-1$ indicates that the process has located the target cache line with the desired rank. If the process determines that I does not equal $\log_2(M)-1$ at step 912, the process increments I by 1 (914) and returns to step 906. If the process determines that I does equal $\log_2(M)-1$ at step 912, the process determines whether the target cache line is clean (916).

If the process determines that the target cache line is not clean at step 916, the process increments the desired rank by 1 (918) and returns to step 904. If the process determines that the target cache line is clean at step 916, the process terminates.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a number of cache lines in a cache, the method comprising:
   determining whether activity on a memory bus in communication with the cache exceeds a threshold activity level;
   responsive to determining that the threshold activity level is exceeded, locating a least important cache line in the cache, wherein the least important cache line is located using a cache replacement scheme;
   responsive to determining that the threshold activity level is exceeded, determining whether the least important cache line is clean;
   responsive to determining that the least important cache line is clean, selecting the least important cache line for replacement in the cache;
   responsive to determining that the least important cache line is not clean, locating a clean cache line within a subset of the number of cache lines and selecting the clean cache line for replacement, wherein the each cache line in the subset is examined in ascending order of importance according to the cache replacement scheme;
   wherein the cache replacement scheme is pseudo-least recently used;
   wherein a desired rank within the subset is zero, and wherein locating the clean cache line within the subset of the number of cache lines comprises:
   creating a binary representation of the desired rank within the subset, wherein the binary representation comprises a set of bits;
   traversing the set of bits, starting with a least significant bit, and a binary tree built from a set of least recently used bits, starting with a root node;
   responsive to observing a '1' in a current bit in the set of bits during a set of bits traversal, inverting a least recently used bit in the set of least recently used bits corresponding to the current bit, wherein the least recently used bit corresponds to the current bit when a binary tree level number of the least recently used bit matches a distance of the current bit from the least significant bit in the set of bits;
   determining whether the set of bits traversal and a binary tree traversal are complete;
   responsive to a determination that the set of bits traversal and the binary tree traversal are not complete, advancing the set of bits traversal and the binary tree traversal and repeating steps of inverting and determining;
   responsive to a determination that the set of bits traversal and the binary tree traversal are complete, forming a target cache line from a desired rank cache way located in the binary tree traversal;
   determining whether the target cache line is clean; and
   responsive to a determination that the target cache line is not clean, repeating steps of creating, traversing, inverting, determining the target cache line based on the binary tree traversal, and determining whether the target cache line is clean, wherein the desired rank is increased by one.

2. The method of claim 1, wherein a size of the subset is smaller than a quantity of the number of cache lines, and wherein the size of the subset is set by a user input.

3. The method of claim 1, wherein determining whether the activity on the memory bus in communication with the cache exceeds the threshold activity level comprises: comparing a population of a bus request queue for the memory bus with the threshold activity level.

4. The method of claim 1, wherein determining whether the activity on the memory bus in communication with the cache exceeds the threshold activity level comprises:
   collecting, by a coherence controller unit, a quantity of requests on the memory bus and a plurality of associated transfer sizes for a period of time; and
   comparing the quantity of requests and the plurality of associated transfer sizes for the period of time with the threshold activity level.

5. The method of claim 1, wherein determining whether the activity on the memory bus in communication with the cache exceeds the threshold activity level comprises:
   providing a bus arbiter that measures an average utilization of the memory bus over a period of time or a quantity of peak utilization instances over the period of time; and
   comparing the average utilization or the quantity of peak utilization instances to the threshold activity level.

6. The method of claim 1, further comprising:
   resuming normal operation of the cache replacement scheme when the activity on the memory bus does not exceed the threshold activity level.

7. A computer program product comprising:
   a computer usable non-transitory storage medium including computer usable program code for managing a number of cache lines in a cache, the computer program product including instructions adapted to cause a computer to perform steps comprising:
   determining whether activity on a memory bus in communication with the cache exceeds a threshold activity level;
   responsive to determining that the threshold activity level is exceeded, locating a least important cache line in the cache, wherein the least important cache line is located using a cache replacement scheme;
   responsive to determining that the threshold activity level is exceeded, determining whether the least important cache line is clean;
   responsive to determining that the least important cache line is clean, selecting the least important cache line for replacement in the cache;
   responsive to determining that the least important cache line is not clean, locating a clean cache line within a subset of the number of cache lines and selecting the clean cache line for replacement, wherein the each cache line in the subset is examined in ascending order of importance according to the cache replacement scheme;
   wherein the cache replacement scheme is pseudo-least recently used;
   wherein a desired rank within the subset is zero, and wherein locating the clean cache line within the subset of the number of cache lines comprises:
   creating a binary representation of the desired rank within the subset, wherein the binary representation comprises a set of bits;
   traversing the set of bits, starting with a least significant bit, and a binary tree built from a set of least recently used bits, starting with a root node;
   responsive to observing a '1' in a current bit in the set of bits during a set of bits traversal, inverting a least recently used bit in the set of least recently used bits corresponding to the current bit, wherein the least recently used bit corresponds to the current bit when a binary tree level number of the least recently used bit matches a distance of the current bit from the least significant bit in the set of bits;

determining whether the set of bits traversal and a binary tree traversal are complete;

responsive to a determination that the set of bits traversal and the binary tree traversal are not complete, advancing the set of bits traversal and the binary tree traversal and repeating steps of inverting and determining;

responsive to a determination that the set of bits traversal and the binary tree traversal are complete, forming a target cache line from a desired rank cache way located in the binary tree traversal;

determining whether the target cache line is clean; and responsive to a determination that the target cache line is not clean, repeating steps of creating, traversing, inverting, determining the target cache line based on the binary tree traversal, and determining whether the target cache line is clean, wherein the desired rank is increased by one.

8. The computer program product of claim 7, wherein a size of the subset is smaller than a quantity of the number of cache lines, and wherein the size of the subset is set by a user input.

9. The computer program product of claim 7, wherein determining whether the activity on the memory bus in communication with the cache exceeds the threshold activity level comprises:
comparing a population of a bus request queue for the memory bus with the threshold activity level.

10. The computer program product of claim 7, wherein determining whether the activity on the memory bus in communication with the cache exceeds the threshold activity level comprises:
collecting, by a coherence controller unit, a quantity of requests on the memory bus and a plurality of associated transfer sizes for a period of time; and
comparing the quantity of requests and the plurality of associated transfer sizes for the period of time with the threshold activity level.

11. The computer program product of claim 7, wherein determining whether the activity on the memory bus in communication with the cache exceeds the threshold activity level comprises:
providing a bus arbiter that measures an average utilization of the memory bus over a period of time or a quantity of peak utilization instances over the period of time; and
comparing the average utilization or the quantity of peak utilization instances to the threshold activity level.

12. The computer program product of claim 7, further comprising:
resuming normal operation of the cache replacement scheme when the activity on the memory bus does not exceed the threshold activity level.

13. An apparatus for managing a number of cache lines in a cache, the apparatus comprising:
a bus system;
a storage device connected to the bus system, wherein the storage device includes program code; and
a processor unit connected to the bus system, wherein the processing unit executes the program code to:

determine whether activity on a memory bus in communication with the cache exceeds a threshold activity level;
locate a least important cache line in the cache, wherein the least important cache line is located using a cache replacement scheme responsive to determining that the threshold activity level is exceeded;
determine whether the least important cache line is clean responsive to determining that the threshold activity level is exceeded;
select the least important cache line for replacement in the cache responsive to determining that the least important cache line is clean;
locate a clean cache line within a subset of the number of cache lines and select the clean cache line for replacement responsive to determining that the least important cache line is not clean, wherein the each cache line in the subset is examined in ascending order of importance according to the cache replacement scheme;
wherein the cache replacement scheme is pseudo-least recently used;
wherein a desired rank within the subset is zero, and wherein locating the clean cache line within the subset of the number of cache lines comprises:
creating a binary representation of the desired rank within the subset, wherein the binary representation comprises a set of bits;
traversing the set of bits, starting with a least significant bit, and a binary tree built from a set of least recently used bits, starting with a root node;
responsive to observing a '1' in a current bit in the set of bits during a set of bits traversal, inverting a least recently used bit in the set of least recently used bits corresponding to the current bit, wherein the least recently used bit corresponds to the current bit when a binary tree level number of the least recently used bit matches a distance of the current bit from the least significant bit in the set of bits;
determining whether the set of bits traversal and a binary tree traversal are complete;
responsive to a determination that the set of bits traversal and the binary tree traversal are not complete, advancing the set of bits traversal and the binary tree traversal and repeating steps of inverting and determining;
responsive to a determination that the set of bits traversal and the binary tree traversal are complete, forming a target cache line from a desired rank cache way located in the binary tree traversal;
determining whether the target cache line is clean; and
responsive to a determination that the target cache line is not clean, repeating steps of creating, traversing, inverting, determining the target cache line based on the binary tree traversal, and determining whether the target cache line is clean, wherein the desired rank is increased by one.

14. The apparatus of claim 12, wherein the processor unit further executes the program code to:
resume normal operation of the cache replacement scheme when the activity on the memory bus does not exceed the threshold activity level.

* * * * *